United States Patent

Carlson et al.

[15] 3,658,552
[45] Apr. 25, 1972

[54] CLOUDING AGENT

[72] Inventors: Paul O. Carlson, Hickory Corners, Mich.; Allan N. Cohan, Cedarhurst; Jack C. Gray, Port Washington, both of N.Y.

[73] Assignee: General Foods Corporation, White Plains, N.Y.

[22] Filed: May 22, 1969

[21] Appl. No.: 827,026

[52] U.S. Cl. ..................... 99/78, 99/118 R, 99/140 R, 99/148 R, 106/209, 106/300, 252/310
[51] Int. Cl. ........................................................ A23l 1/27
[58] Field of Search ............ 99/78, 148 R, 63, 118 R, 140 R; 106/300, 209, 208; 252/310

[56] References Cited

UNITED STATES PATENTS

| 3,579,356 | 5/1971 | Miller et al. | 99/148 |
| 3,023,106 | 2/1962 | Common | 99/78 |
| 3,054,724 | 9/1962 | Raff | 99/148 X |
| 3,149,039 | 9/1964 | Jeffries | 99/148 UX |
| 3,592,940 | 7/1971 | Quesada | 99/148 |

OTHER PUBLICATIONS

Fischer, Colloidal Dispersions, 1950, pages 254–257
Handbook of Food Additives, 1968, page 39

Primary Examiner—Morris O. Wolk
Assistant Examiner—Stephen B. Davis
Attorney—Bruno P. Struzzi, Daniel J. Donovan and Thomas V. Sullivan

[57] ABSTRACT

A clouding agent for incorporation into a dry beverage mix is prepared by forming a dispersion in an aqueous matrix of gum of melted plastic fat and finely ground particles of an inorganic whitening pigment. The mixture is emulsified and dried to a solid having a moisture content of less than 10 percent by weight of the cloud material. The plastic fat comprises a minor proportion and the gum a major proportion based on the total weight of the clouding agent. The preferred inorganic whitening pigment is titanium dioxide.

6 Claims, No Drawings

CLOUDING AGENT

BACKGROUND OF THE INVENTION

1. Field of the Invention

The present invention relates to improved fruit flavored beverages and more particularly to clouding agents of improved opacity.

2. Description of the Prior Art

In the field of flavored beverages, it has been general practice to employ a stable clouding agent in dry powdered beverage compositions to give the desired opacity of natural juice, when reconstituted, while providing a beverage mix which offers natural mouthfeel. Such a clouding agent is taught by Common, U.S. Pat. No. 3,023,106, who discloses employing a fat and water soluble gum as a clouding agent for fruit drinks.

In attempting to simulate the very opaque natural appearance of some juices it has been necessary to incorporate such high levels of the clouding agent that the fat and gum portion of the cloud produced an undesirable "mouthfeel" or texture when the juice is consumed. Furthermore, the degree of opacity possible using a fat-gum system is limited. In addition, the incorporation of high levels of clouding agent is prohibited due to high cost and may lead to storage stability problems of the fat phase.

SUMMARY OF THE INVENTION

General purpose of this invention is to provide a clouding agent for beverages having improved opacity. To attain this, the present invention provides for incorporating one or more inorganic whitening pigments in a clouding agent which comprises a plastic fat and a hydrophilic colloidal material.

The incorporation of whitening pigments such as titanium dioxide allows a substantial reduction in the level of cloud necessary to obtain a particular opacity thereby producing a corresponding improvement in the texture of final drink, namely an improvement in mouthfeel, an improvement in storage stability and a reduction in overall cost of the clouding agent per unit of beverage.

An object of the present invention is the provision of improved opacity of a beverage clouding agent.

A further object is to improve mouthfeel of beverages containing cloud.

Another object is to provide a clouding agent of improved storage stability.

A further object of this invention is the provision of reduced cost cloud.

DESCRIPTION OF THE INVENTION

The clouding agent of this invention is prepared by admixing a plastic fat, a hydrophilic encapsulating colloidal material, and a whitening pigment, to produce a dried emulsion of these materials suitable for producing a clouding effect in artificial beverage.

The hydrophilic encapsulating colloidal material is typically a water soluble gum like gum arabic, gum tragacanth, gum acaria and the like, and is present in a major proportion in the finished clouding material.

The plastic fat is any fat that is semi-solid at room temperature, that is a product which is a mixture of fats and oils at temperatures in the order of 60° F. Plastic fat may be compounded by any one of a number of means known to those versed in the art, such as by hardening through hydrogenation of vegetable oils. Typically, coconut oil may be hydrogenated to give a semi-solid material having a Wiley melting point of 98° F., a capillary melting point of 104° F., an iodine value of 5.2, a saponification number of approximately 253, and a solids content index of 43 percent at 20° C. To this material is added 6 percent stearin to yield a partially solidified fat having a Wiley melting point of 111° F., a capillary melting point of 116° F., an iodine value of 2.2, a saponification number of approximately 254, and a solids content index of from 48–50 percent solids at a temperature of 20° C.

The inorganic whitening pigment may be any commonly used white opaque pigments or white extender pigments disclosed in the Kirk-Othmer Encylopedia of Chemical Technology, second ed., vol. 15, pp. 496–517 which is compatible for food use such as titanium dioxide in either rutile or anatase crystal form or a mixture thereof. Where extender pigments are employed such as calcium sulfate, calcium carbonate, china clays, bentonite and the like it is preferred that they be combined with a white opaque pigment such as titanium dioxide. Combinations of pigments may be prepared by either mechanically mixing one or more pigments together or by causing the pigments to precipitate from solution or by other well known methods. When a mixture of pigments is desired for improved opacity, it is preferred that the finished pigment comprise a major proportion of a primary pigment with an index of refraction of 1.75 or above with white extender pigments constituting a minor proportion having index of refractions usually from 1.45 to 1.7. It is preferred to employ titanium dioxide as the sole cloud pigment due to its superior whiteness and brightness value.

Proportions of plastic fat to hydrophilic colloidal material employed in the cloud of this invention may range from 1:2 to 1:9 although an amount of fat from 20 to 25 percent by weight of the colloidal gum is preferred.

The proportion of inorganic whitening pigment may vary from 0.1 to 25 percent by weight of the total cloud solids with 1 to 5 percent preferred. When titanium dioxide is employed as the sole pigment it is preferred to employ from 2 to 4 percent by weight of the cloud solids (fat and gum).

The quantity of cloud to be employed in a beverage will depend on the degree of opacity desired and the level of pigment employed in the cloud. In general from 0.1 to 10 percent of the dry beverage powder can comprise cloud although from 1 to 5 percent by weight is preferred for fruit flavored beverages.

The dry cloud product of this invention may be characterized as comprising a matrix of water soluble constituents having as dispersed phases therein discrete particles of plastic fat and finely ground particles of pigments. The pigment particles may be dispersed in the matrix of water soluble solids or in the fat, or may be dispersed within both the fat and matrix phases.

The cloud material is made by forming a suspension or emulsion of melted fat particles and fine pigment dispersed in an aqueous matrix of gum which, after suitable emulsification is sprayed dried or otherwise dried to a solid, having a moisture content below 10 percent, usually about 3 percent.

In achieving a dry cloud emulsion that is readily reconstituted in water with gentle stirring and which will neither float to the top of the liquid or accumulate at the bottom of the liquid, it is important to homogenize the aqueous emulsion of water soluble gum and plastic fat to the extent that very discrete particles are formed and also to the extent that the dried emulsion has the desired particle size distribution. In practice, the preferred procedure is to process an aqueous suspension of melted plastic fat and gum through a Manton-Gaulin homogenizer at a pressure between 500 and 3,000 PSI where the shearing force of the homogenizing valve reduces the globule size of the plastic fat and produces the desired clouding effect without settling or floating. Equally important is to employ pigment particles that will remain in suspension at least for a short period, namely the time necessary to consume the beverage. This may be done by milling the pigment prior to or after addition to the other cloud ingredients.

It is preferred in preparing the improved cloud formulation, to prepare a smaller mixture of gum or fat and incorporate the pigment into this mixture. The mixture is then placed under a high degree of shear in order to reduce the pigment particle size and suspend the pigment in the vehicle.

We have discovered that a high shear planetary mixer such as manufactured by Charles Ross & Son Co. mixer model 130EL produces a satisfactory pigment particle. The titanium dioxide or other pigment is added to the fat or gum and wetted at slow speed. When all pigment is added the maximum speed is employed for a 15 minute or longer period to suspend and mill the pigment. Obviously, alternative means well known in the pigment industry may be employed for producing equivalent compositions, such as a conventional paint mill and other equivalent milling equipment.

Once a concentrated pigment suspension is prepared, it is added to the remainder of the cloud formula and homogenized to give the desired colloidal fat particle size, and dried. While it is preferred to add the pigments to either a portion of the fat or a portion of the gum employed in the clouding agent, the pigment may be added, if desired, to either a combination of fat and the gum or even to the water phase used to dissolve the gum in preparing the final cloud material.

The dried cloud ingredients are typically mixed with other beverage materials such as tartaric acid, citric acid or other food acids; sugars such as sucrose, dextrose, fructose and the like; suitable coloring agents such as orange coloring, cherry coloring and the like; fruit flavors such as lemon, lime, orange and the like; and other art recognized beverage additives such as carboxymethylcellulose and its salts for the desired mouthfeel, tricalcium phosphate and other phosphates for promoting flowability and the like.

The invention is more fully described but not limited by the following examples.

EXAMPLE 1

To a high shear planetary mixer is added 21.3 parts hot water and 2.61 parts gum arabic. The gum is dissolved with gentle (slow) mixing. To the resulting solution is added 28.3 parts titanium dioxide, grade AMO manufactured by Titanium Pigment Corporation. Upon wetting, and while still mixing at slow speed, there is added an additional 28.3 parts titanium dioxide. After all titanium dioxide is added and wetted, the mixer speed is increased to maximum speed and shear and is maintained for a 15 minute period. The mixture is then diluted with 19.5 parts water to produce a flowable mixture which, while it may last several hours, is preferably employed immediately to prepare the final cloud material. 64.5 pounds of the titanium dioxide mixture prepared above, is added to the remainder of the cloud formula which is previously prepared by dissolving 1,035 pounds of gum arabic solids in hot water to form a solution at about 150° F. to which, after filtering, is added 250 pounds of hydrogenated coconut oil. The entire batch is mixed until emulsified.

The titanium dioxide mixture is added to the emulsified gum and oil mixture and the entire batch is emulsified by passing through a two-stage Manton-Gaulin homogenizer. The second stage is operated at 500 PSI pressure while the first stage is operated at a 2,200 PSI pressure. After homogenization, the mixture is spray dried to obtain a finished cloud product having a moisture content below 5 percent.

Cloud prepared as above containing titanium dioxide pigment has a greater opacity, namely about 300 Klett Summerson units as compared to between 180 to 240 Klett Summerson units for a similar cloud product not containing titanium dioxide. In all cases measurements are made using a 0.075 percent aqueous solution, a number 66 filter and a 20 mm. cell width. The finished cloud material has a density nearly equivalent to cloud without pigment.

When cloud containing titanium dioxide, made as in Example 1, is used to replace regular cloud having the same formulation, but without pigment, there need be added only about 80 percent by weight of the amount normally used in a beverage to obtain equivalent opacity.

EXAMPLE 2

A titanium dioxide premixture is prepared by melting 21.3 parts hydrogenated coconut oil at a temperature of 150° F. in a water-jacketed mixing bowl. To this is added 0.28 parts lecithin which is thoroughly dispersed in the oil with rather vigorous mixing. To this mixture is added 28.3 parts titanium dioxide which is uniformly distributed at a low mixing speed. To this mixture is added an additional 28.3 parts titanium dioxide gradually with uniform stirring until the titanium dioxide is "wet" by the oil. The mixture is then diluted with 21.8 parts of melted hydrogenated coconut oil. This material or pre-mix is maintained at 150° F. and is added to a gum arabic water slurry and homogenized as is hereinafter described.

A mixture of gum arabic solids and coconut oil is prepared by dissolving 1,035 pounds of gum arabic in 1,988 pounds of water. To this mixture is added 222 pounds hydrogenated coconut oil and the mixture emulsified by conventional techniques. To this mixture is added 64.5 pounds of the titanium dioxide pre-mix to give a final batch which contains:

| Ingredient | Weight |
|---|---|
| Hydrogenated Coconut Oil | 222 lbs. |
| Titanium Dioxide Mixture | 64.5 lbs. |
| Gum Arabic Solids | 1,035 lbs. |
| Water | 1,988 lbs. |

This batch is homogenized in a two-stage Manton-Gaulin homogenizer and spray dried to a dry, particulate cloud material having a Klett Summerson opacity value of about 300 units. When the second portion of titanium dioxide is replaced by bentonite and titanium dioxide of the rutile crystaline form, there is obtained a cloud material having improved opacity in beverages as compared to conventional cloud material not containing inorganic pigments.

When hydrogenated safflower seed oil, cottonseed oil and soybean oil is substituted for coconut oil in the previous example, there is obtained similar fat dispersions suitable for cloud purposes.

EXAMPLE 3

A fruit flavored beverage mix is prepared employing the cloud prepared as in Example 2 in accordance with the following formulation:

| Ingredient | Parts by Weight |
|---|---|
| Sucrose | 89.28 |
| Citric Acid | 5.53 |
| Clouding Agent | 2.28 |
| Sodium Carboxymethyl Cellulose (low viscosity) | 0.90 |
| Tricalcium Phosphate | 0.49 |
| Trisodium Citrate | 0.70 |
| Vitamin C | 0.47 |
| Tenfold Orange Oil | 0.26 |
| Vitamin A | 0.04 |
| Color (Mixture of F.D.&C. No. 5 and F.D.&C. No. 6 yellow) | 0.01 |

Sixty-five grams of the above beverage mix is reconstituted in a pint of water and produced a beverage of greater opacity than that produced using regular cloud in the same proportion.

When the quantity of titanium dioxide containing cloud prepared as in Example 2 is reduced to 1.82 parts by weight there is produced a beverage of highly acceptable mouthfeel, cloud stability and fruit juice appearance which is equivalent in opacity to a similar beverage containing 2.28 parts by weight of the same cloud without pigment. Furthermore, mouthfeel is considerably improved.

What is claimed is:

1. A method for preparing a dry cloud material for dry beverage mixes characterized as a matrix of water soluble gum having dispersed phases therein of discrete particles of plastic fat and finely ground particles of inorganic pigment comprising providing finely ground particles of inorganic pigment, preparing an emulsion of melted fat particles and said finely ground pigment particles in a major proportion of an aqueous matrix of gum, and drying the emulsion to a solid having a moisture content of less than 10 percent by weight of the cloud material, said pigment particles of a size effective to remain in suspension for a time necessary to consume the beverage.

2. The method of claim 1 wherein the pigment is titanium dioxide and wherein the titanium dioxide is first dispersed in either the aqueous gum or fat so as to wet the titanium dioxide and wherein the finely ground particles are provided by milling the wetted titanium dioxide to suspend the titanium dioxide in the aqueous gum or fat, and finally preparing an emulsion of said aqueous gum, fat and finely ground titanium dioxide and drying.

3. A dry clouding agent for dry beverage mixes which when reconstituted have improved opacity without undesirable mouthfeel or texture comprising a major proportion of a water soluble gum having dispersed therein a minor proportion of plastic fat of reduced particle size and finely ground particles of titanium dioxide, said proportions based on the weight of the clouding agent, said fat and titanium dioxide being of a size effective to produce the desired clouding effect in the reconstituted beverage while remaining suspended, to a time sufficient to consume the beverage.

4. A method of improving the opacity of a beverage which comprises incorporating in the dry beverage mix, which is to be reconstituted to form the beverage, a clouding agent comprising a minor proportion based on the total weight of the clouding agent of plastic fat, 1-5 percent finely ground titanium dioxide in a major proportion based on the total weight of the clouding agent of a water soluble gum matrix.

5 A fruit flavored beverage mix comprising a combination of edible acidic substances, sugar, fruit flavor and color, and a dried cloud emulsion of homogenized plastic fat and water soluble gum, said fat being present in minor proportion of the said cloud emulsion and said gum being present in major proportion of the said cloud emulsion and said dried emulsion containing therein an effective amount of inorganic pigment particles for improving the opacity of the beverage.

6. The beverage mix of claim 5 in which the pigment is present in from 1-5 percent by weight of the cloud and in which the cloud is present in from 1-5 percent by weight of the beverage and wherein the pigment is titanium dioxide.

* * * * *